United States Patent
Keller et al.

(10) Patent No.: US 8,102,132 B2
(45) Date of Patent: Jan. 24, 2012

(54) STARTING APPARATUS FOR AT LEAST TWO SYNCHRONOUS MACHINES

(75) Inventors: Tobias Keller, Gebenstorf (CH); Rudolf Wieser, Baden-Dättwil (CH)

(73) Assignee: ABB Schweiz AG, Baden (CH)

( * ) Notice: Subject to any disclaimer, the term of this patent is extended or adjusted under 35 U.S.C. 154(b) by 423 days.

(21) Appl. No.: 12/471,898

(22) Filed: May 26, 2009

(65) Prior Publication Data

US 2009/0295312 A1 Dec. 3, 2009

(30) Foreign Application Priority Data

May 27, 2008 (EP) .................................... 08156952

(51) Int. Cl.
*H02P 1/58* (2006.01)
*H02P 5/46* (2006.01)

(52) U.S. Cl. .......... 318/103; 318/43; 318/135; 104/281; 104/290; 104/292

(58) Field of Classification Search .................... 318/43, 318/105, 135; 104/281, 290, 292
See application file for complete search history.

(56) References Cited

U.S. PATENT DOCUMENTS

| | | | | |
|---|---|---|---|---|
| 5,136,217 | A * | 8/1992 | Hoffmann et al. | 318/135 |
| 5,712,514 | A * | 1/1998 | Fischperer et al. | 307/69 |
| 7,245,093 | B2 * | 7/2007 | Engel et al. | 318/135 |
| 2006/0007927 | A1 | 1/2006 | Lee et al. | |
| 2006/0261762 | A1 * | 11/2006 | Engel et al. | 318/135 |
| 2007/0139019 | A1 | 6/2007 | Wiegman et al. | |
| 2008/0073979 | A1 | 3/2008 | Wiegman et al. | |
| 2009/0115357 | A1 * | 5/2009 | Engel | 318/135 |
| 2009/0243789 | A1 * | 10/2009 | Engel et al. | 340/3.1 |

FOREIGN PATENT DOCUMENTS

| | | |
|---|---|---|
| EP | 1 798 836 A1 | 6/2007 |
| JP | 5-3632 A | 1/1993 |
| JP | 2003-259693 A | 9/2003 |
| JP | 2007-166727 A | 6/2007 |

OTHER PUBLICATIONS

European Search Report dated Sep. 18, 2008.

* cited by examiner

*Primary Examiner* — Paul Ip
(74) *Attorney, Agent, or Firm* — Buchanan Ingersoll & Rooney PC

(57) ABSTRACT

A starting apparatus is disclosed for at least two synchronous machines, which starting apparatus includes an exciter unit which is provided for each synchronous machine and is associated with the respective synchronous machine. Each exciter unit can be connected to the field winding of the associated synchronous machine. A superordinate control unit is provided, with the superordinate control unit being connected via a communication link to each exciter unit. Furthermore, the starting apparatus includes at least one stator feed unit and at least one switching device, which is provided for each stator feed unit and is associated with the respective stator feed unit, in which case the respective switching device can be connected to the associated stator feed unit, the respective switching device can be connected to at least one synchronous machine, and the switching devices can be connected to one another when there are a plurality of switching devices. The exciter units can be connected to one another via a ring communication link. Each stator feed unit can be connected to the ring communication link. Each stator feed unit can also be connected via a communication link to an associated switching device, and exciter units which are associated with the stator feed units can be each connected via a communication link to a switching device.

5 Claims, 2 Drawing Sheets

STARTING APPARATUS FOR AT LEAST TWO SYNCHRONOUS MACHINES

RELATED APPLICATION

This application claims priority under 35 U.S.C. §119 to European Patent Application No. 08156952.7 filed in Europe on May 27, 2008, the entire content of which is hereby incorporated by reference in its entirety.

FIELD

The disclosure relates to the field of synchronous machines, such as a starting apparatus for at least two synchronous machines.

BACKGROUND INFORMATION

Nowadays, synchronous machines are used in a multiplicity of applications. For example, in the case of a gas-turbine power station having a plurality of gas turbines and generators which are connected to the gas turbines and are in the form of synchronous machines, the synchronous machines can be used to start the gas turbines. A starting apparatus which starts the synchronous machines and therefore also the gas turbines can be used for this purpose. FIG. 1 shows one modern known starting apparatus for at least two synchronous machines. In this Figure, the starting apparatus has an exciter unit SES which is provided for each synchronous machine G and is associated with the respective synchronous machine G, with the respective exciter unit SES being connected to the field winding of the associated synchronous machine G and being used to feed the field winding. A superordinate control unit DCS is also provided, with the superordinate control unit DCS being connected via a communication link to each exciter unit SES. Like other communication links which will also be mentioned, the communication link is represented by a dashed line in FIG. 1. Furthermore, at least one stator feed unit SSD and a switching device SSB are provided. A switching device SSB is provided for each stator feed unit SSD and is associated with the respective stator feed unit SSD, in which case the respective switching device SSB can be connected to the associated stator feed unit SSD, the respective switching device SSB can be connected to at least one synchronous machine G, and the switching devices SSB can be connected to one another when there are a plurality of switching devices SSB. The superordinate control unit DCS is connected via a communication link to each switching device SSB. Furthermore, the superordinate control unit DCS is connected via a communication link to each stator feed unit SSD.

When it is now intended to start a synchronous machine G by a known starting apparatus as shown in FIG. 1, the superordinate control unit DCS passes an appropriate signal via the communication link to the exciter unit SES, which then applies an exciter voltage to the field winding of the synchronous machine G that is being started. Furthermore, the superordinate control unit DCS passes an appropriate signal via the communication link to one or more switching devices SSB, in response to which a stator feed unit SSD, which selects the superordinate control unit DCS via the communication link using a signal, is connected to the stator winding of the synchronous machine G due to be started, with the stator feed unit SSD applying a feed voltage to the stator winding and then starting the desired synchronous machine G.

The starting apparatus as described above and as shown in FIG. 1 can be subject to a communication link which exists in each case from the superordinate control unit DCS to each exciter unit SES, to each switching device SSB and to each stator feed unit SSD. The superordinate control unit DCS can be integrated in a central control station, well away from the synchronous machines G, from the exciter units SES, from the switching devices SSB and from the stator feed units SSD. As a result, the communication links can cover large distances, as a result of which the starting apparatus can be complex to implement and to maintain, and the susceptibility to defect can rise. A further factor which can affect the susceptibility to defects of the starting apparatus as described above and shown in FIG. 1 is that the superordinate control unit DCS can include virtually all the control tasks for the starting process, and the superordinate control unit DCS therefore can have to carry out virtually all the central control functions. However, if one or more communication links of the superordinate control unit DCS is interrupted, for example because of a fault, then operation of the starting apparatus can be either completely impossible or no longer worthwhile, with the starting apparatus then no longer being available.

SUMMARY

A starting apparatus is disclosed, for at least two synchronous machines, comprising: an exciter unit associated with each respective synchronous machine, with each exciter unit being connected to a field winding of the associated synchronous machine; a superordinate control unit connected to each exciter unit; at least one stator feed unit and a switching device associated with the stator feed unit, in which case the switching device can connect to the associated stator feed unit, can connect to at least one synchronous machine, and can connect to other switching devices when there are a plurality of switching devices associated with respective ones of the stator feed units; and a ring communication link for connecting the exciter units to one another, each stator feed unit being connected to the ring communication link, and being connected to communicate with the switching device, wherein the exciter units associated with the stator feed units are connected via a communication link to the switching device.

BRIEF DESCRIPTION OF THE DRAWINGS

Various objects, advantages and features of the present disclosure will become clear from the following detailed description of exemplary embodiments of the disclosure when read in conjunction with the drawings.

In the Figures.

Figure 1:
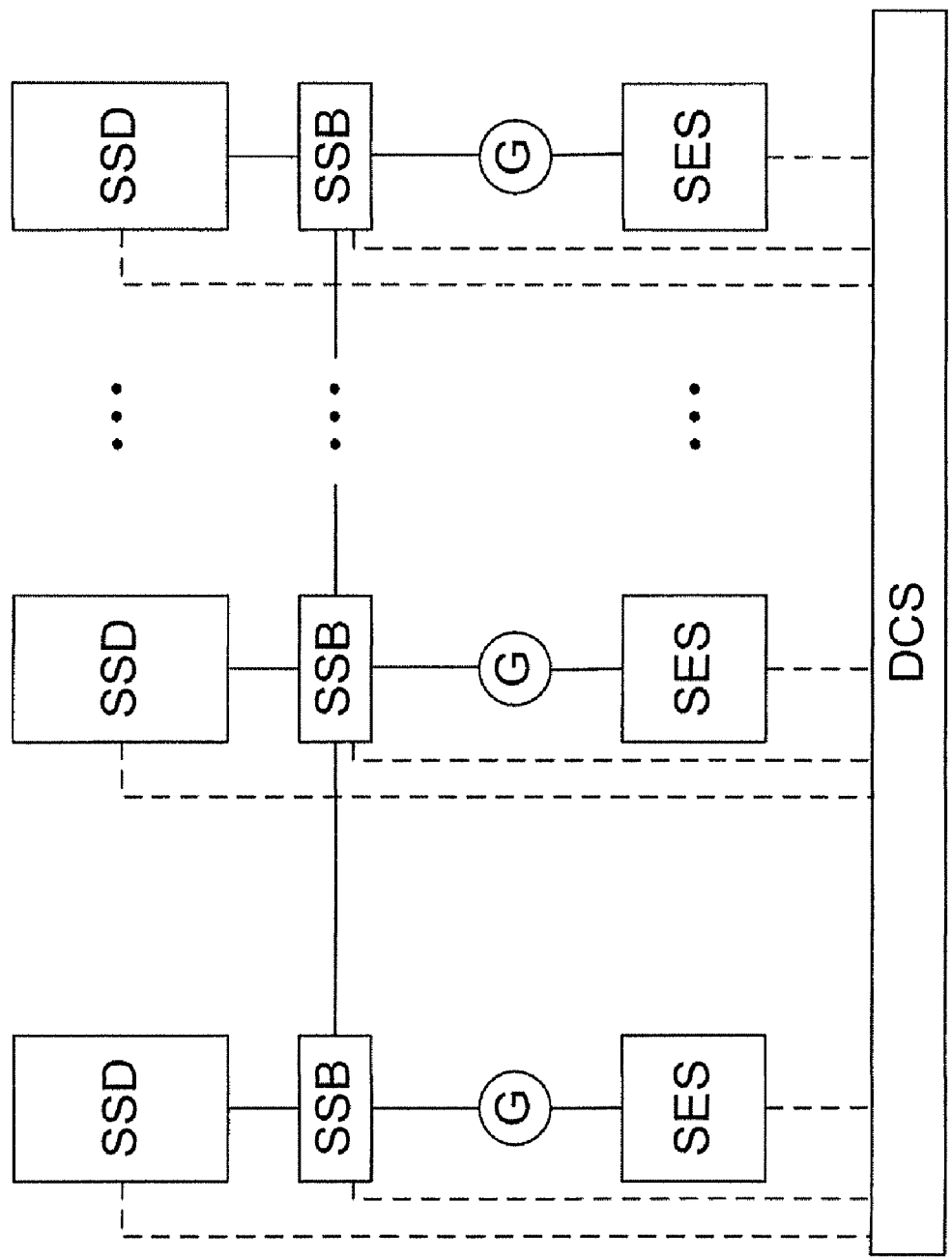
FIG. 1 shows one embodiment of a known starting apparatus.

The reference symbols used in the drawings, and their meanings, are listed in summary form in the list of reference symbols. In principle, the same parts are provided with the same reference symbols in the Figures. The described embodiments represent examples of the subject matter of the disclosure, and have no restrictive effect.

DETAILED DESCRIPTION

A starting apparatus is disclosed for at least two synchronous machines, which starting apparatus can be very simple to implement and to maintain and can have a low susceptibility to defects.

An exemplary starting apparatus according to the disclosure for at least two synchronous machines has an exciter unit provided for each synchronous machine and is associated with each the respective synchronous machine, with each respective exciter unit being connected to the field winding of the associated synchronous machine. Furthermore, a superordinate control unit is provided, with the superordinate control unit being connected via a communication link to each exciter unit. In addition, an exemplary starting apparatus according to the disclosure comprises at least one stator feed unit and one switching device, which is provided for each stator feed unit and is associated with the respective stator feed unit, in which case the respective switching device can be connected to the associated stator feed unit, the respective switching device can be connected to at least one synchronous machine, and the switching devices can be connected to one another when there are a plurality of switching devices.

The exciter units can be connected to one another via a ring communication link. Each stator feed unit can be furthermore connected to this ring communication link, and each stator feed unit can be connected via a communication link to the associated switching device. The exciter units can be associated with the stator feed units and therefore can correspond in particular to the number of the stator feed units, and can be furthermore each connected via a communication link to a switching device.

When a synchronous machine is about to start, the superordinate control unit can pass an appropriate signal via the communication link to the associated exciter unit, which then applies an exciter voltage to the field winding of the synchronous machine to be started. The associated exciter unit uses a signal sent via the ring communication link to select a stator feed unit by means of which a stator voltage is then applied to the synchronous machine to be started. In order to allow the selected stator feed unit to apply the stator voltage to the synchronous machine to be started, the exciter units which are associated with the stator feed units can be addressed by means of a signal from the exciter unit associated with the synchronous machine to be started, via the ring communication link. In response to this signal, each of these exciter units then sends a signal via the communication link to the respective switching device, in response to which the switching device or devices which is or are to be used for the connection of the selected stator feed unit to the synchronous machine to be started is or are switched in order to produce the link. Once the stator feed unit, which can use only one switching device for the connection to the synchronous machine to be started, has been selected, then this starting device sends an appropriate signal directly to the switching device via the communication link, in order to produce the link.

Overall, by virtue of its design, an exemplary starting apparatus according to the disclosure can be very simple to implement and to maintain since only the superordinate control unit, for example integrated in a central control station, is away from (e.g., well away from) the remaining components of the starting apparatus according to the disclosure. Therefore, only a very small number of long distances have to be covered for the communication links to the individual exciter units. The susceptibility to defects can therefore likewise fall, and the availability of the starting apparatus rise. Furthermore, the superordinate control unit can carry out far fewer control tasks for the starting process, a large proportion of which are now carried out by the individual exciter units, thus making it possible to further reduce the susceptibility to defects and to further increase the availability.

Figure 2:
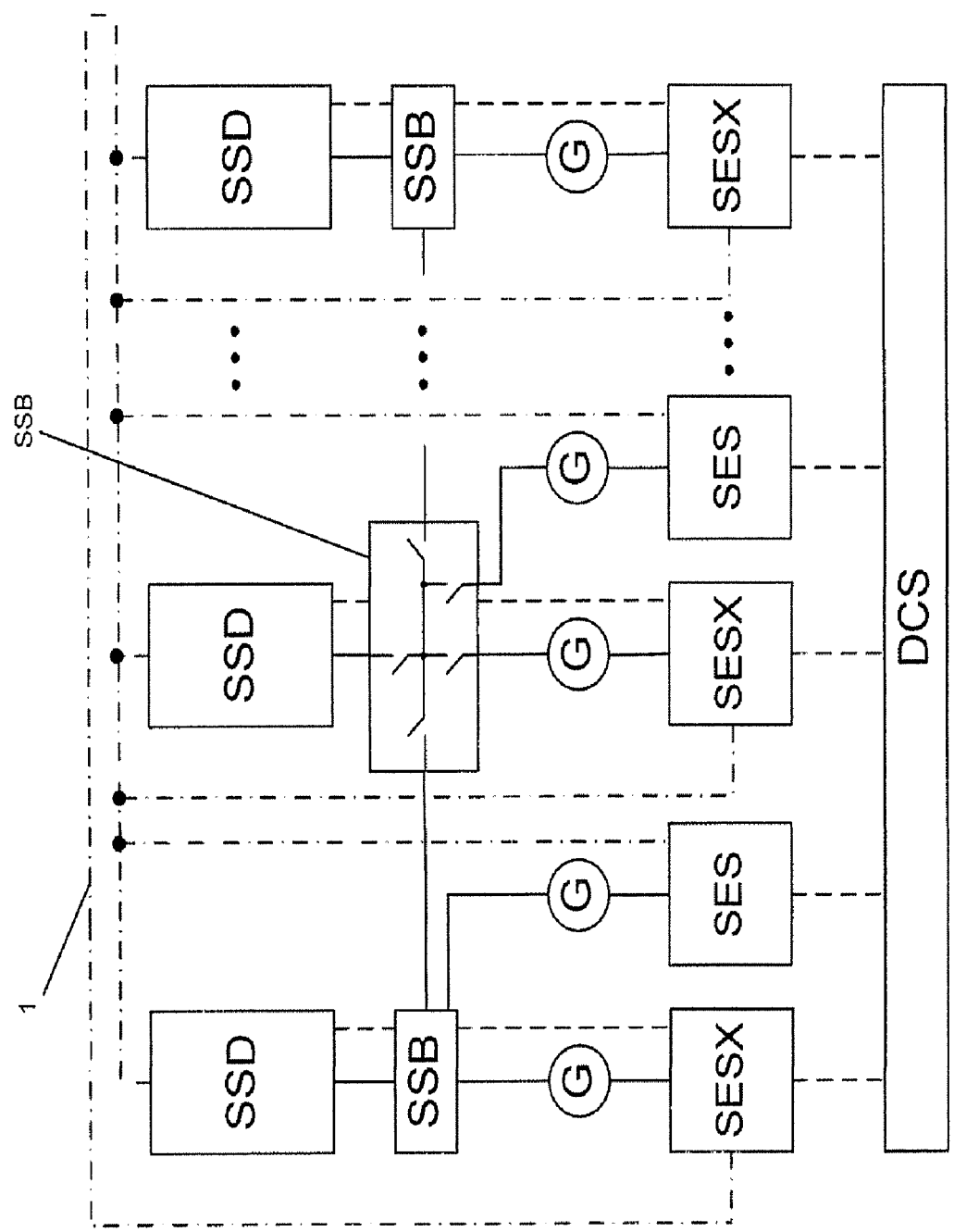
FIG. 2 shows an exemplary embodiment of a starting apparatus according to the disclosure.

FIG. 2 shows an exemplary embodiment of a starting apparatus for at least two synchronous machines G according to the disclosure. As shown in FIG. 2, the starting apparatus comprises an exciter unit SES, SESX, which is provided for each synchronous machine G and is associated with the respective synchronous machine G, with the respective exciter unit SES, SESX being connected to the field winding of the associated synchronous machine G. Furthermore, a superordinate control unit DCS is provided, with the superordinate control unit DCS being connected via at least a portion of a communication link to each exciter unit SES, SESX. The communication link mentioned above as well as the further communication links which are mentioned in detail in the following text as well, are represented as dashed lines in FIG. 2, and can be considered separate communication links and/or portions of a common communication link.

An exemplary starting apparatus according to the disclosure comprises at least one stator feed unit SSD and at least one switching device SSB, which can be provided for each stator feed unit SSD and associated with a respective stator feed unit SSD, in which case the respective switching device SSB can be connected to the associated stator feed unit SSD. Furthermore, each switching device SSB can be connected to at least one synchronous machine G. When there are a plurality of switching devices SSB, as is illustrated by way of example in FIG. 2, the switching devices SSB can be connected to one another. In FIG. 2, by way of example, the second switching device SSB when seen from the left is implemented by means of switches, in which case any implementation that is suitable for the functionality disclosed herein is feasible, using suitable switches of any type. According to the disclosure, the exciter units SES, SESX can now be connected to one another via a ring communication link 1. Each stator feed unit SSD can be furthermore connected to this ring communication link, and each stator feed unit SSD can be connected via a communication link to the associated switching device SSB. The ring communication link 1 mentioned above is illustrated in a form of dashed-dotted lines in FIG. 2. The exciter units SESX, which correspond in particular to the number of the stator feed units SSD, are furthermore each connected via a communication link to a switching device. These exciter units SESX are then associated with the stator feed units SSD.

By way of example, when starting the first synchronous machine G when seen from the right in FIG. 2, the superordinate control unit DCS passes an appropriate signal via the communication link to the associated exciter unit SESX, that is to say, in FIG. 2, to the first exciter unit SESX, seen from the right, which then applies an exciter voltage to the field winding of the synchronous machine G to be started. Via the ring communication link, the associated exciter unit SESX then uses a signal to select a stator feed unit SSD, for example the first stator feed unit SSD seen from the left in FIG. 2, by means of which a stator voltage is then applied to the synchronous machine G to be started. In order to allow the selected stator feed unit SSD to apply the stator voltage to the synchronous machine G to be started, the exciter units SESX which are associated with the stator feed units SSD are addressed by means of a signal via the ring communication link by the exciter unit SESX associated with the synchronous machine G to be started. In response to this signal, each of these exciter units SESX then sends a signal via the communication link to the respective switching device SSB, in response to which that switching device or those switching devices which is or are required for the connection of the selected stator feed unit SSD to the synchronous machine to be started is or are switched appropriately, in order to produce the link. In the example, these would then be all the switching devices SSB, in order to produce a link in FIG. 2 from the first stator feed unit SSD, seen from the left, to the first synchronous machine G, seen from the right. Alternatively, it would also be feasible to now use the signal which is passed to the ring communication link by the exciter unit SESX which is associated with the synchronous machine G to be started to address the stator feed units SSD which then address the respective switching devices SSB via the communication links by means of a signal, which switching devices SSB then in the end and in response to this produce the desired link between the selected stator feed unit SSD and the synchronous machine G to be started.

If the stator feed unit SSD which uses only one switching device SSB for the link to the synchronous machine G to be started is selected, then this starting device SSD sends an appropriate signal via the communication link directly to the switching device SSB, in order to produce the link. In this example, this means that the first stator feed unit SSD seen from the right in FIG. 2 would be selected and that an appropriate signal would then be sent via the communication link to the first switching device SSB seen from the right, in order to produce a link from the selected stator feed unit SSD to the first synchronous machine G, seen from the right, to be started.

It is, of course, also possible to use the starting apparatus according to the disclosure to start a plurality of synchronous machines G at the same time or successively, in which case each starting process is then carried out in a similar manner, as described by way of example above.

The starting apparatus according to the disclosure can be extremely simple to implement and to maintain by virtue of its design, since only the superordinate control unit DCS, for example integrated in a central control station, is well away from the remaining components (exciter units SES, SESX, stator feed units SSD, switching devices SSB) and therefore only a very small number of long distances need be covered for the communication links to the individual exciter units SES, SESX. The susceptibility to defects therefore likewise falls considerably, and the availability of the starting apparatus rises. Furthermore, the superordinate control unit DCS has to carry out far fewer control tasks for the starting process, a large proportion of which are now carried out by the individual exciter units SES, SESX, thus making it possible to further reduce the susceptibility to defects and to further increase the availability.

Each exciter unit SES which is not connected via a communication link to a switching device SSB can include control logic, with the control logic of the respective exciter unit SES being connected to the ring communication link 1, and being connected to the superordinate control unit DCS via the communication link. The respective control logic can be advantageously used to receive and to transmit signals to and from the superordinate control unit DCS and to and from the ring communication link 1, which are used in particular for the starting process for one or more synchronous machines G, as described by way of example above.

The exciter units SESX which are each connected via a communication link to a switching device SSB likewise can each have control logic, with the control logic of the respective exciter unit SESX being connected to the ring communication link 1, and being connected to the superordinate control unit DCS via the communication link. This respective control logic can be also advantageously used to receive and transmit signals to and from the superordinate control unit DCS and to and from the ring communication link 1, which are used, for example for the process of starting one or more synchronous machines G, as described by way of example above. Furthermore, each switching device SSB can include control logic, with the control logic of the respective switching device SSB being connected to the control logic of the respective exciter unit SESX via the communication link. The control logic of the respective switching device SSB can, for example, be used to receive and transmit signals to and from the respective exciter unit SESX, which, in particular, can also be used required for starting one or more synchronous machines G, as described by way of example above.

Furthermore, each stator feed unit SSD can include control logic, with the control logic of the respective stator feed unit SSD being connected to the ring communication link 1. The control logic of each respective switching device SSB can be connected to the control logic of the associated stator feed unit SSD via the communication link. The control logic of each respective switching device SSB can be accordingly furthermore also used to receive and transmit signals to and from the associated stator feed unit SSD, and the control logic of the respective stator feed unit SSD can be used to receive and transit signals to and from the respective switching device SSB, and to and from the ring communication link 1. Furthermore, the control logic of the respective stator feed unit SSD can also be used to store and evaluate data for the selection of the stator feed unit SSD by the appropriate exciter unit SES, SESX.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Ring communication link
G Synchronous machine
SES, SESX Exciter unit
DCS Superordinate control unit
SES Exciter unit
SSB Switching device
SSD Stator feed unit

The invention claimed is:

1. A starting apparatus for at least two synchronous machines, comprising:
    an exciter unit associated with each respective synchronous machine, with each exciter unit being connected to a field winding of the associated synchronous machine;
    a superordinate control unit connected to each exciter unit;
    at least one stator feed unit and a switching device associated with the stator feed unit, in which case the switching device can connect to the associated stator feed unit, can connect to at least one synchronous machine, and can connect to other switching devices when there are a plurality of switching devices associated with respective ones of the stator feed units;
    a ring communication link for connecting the exciter units to one another, each stator feed unit being connected to the ring communication link, and being connected to communicate with the switching device, wherein the exciter units associated with the stator feed units are connected via a communication link to the switching device.

2. The starting apparatus as claimed in claim 1, comprising:
    an exciter unit which is not connected via the communication link to a switching device, and which has control logic, with the control logic being connected to the ring communication link, and being connected to the superordinate control unit via the communication link.

3. The starting apparatus as claimed in claim 1, wherein the exciter units which are connected via the communication link to the switching device each have control logic, with the control logic of the exciter units being connected to the ring communication link, and being connected to the superordinate control unit via the communication link; and wherein each switching device has control logic, with the control logic of the switching devices being connected to the control logic of the exciter units via the communication link.

4. The starting apparatus as claimed in claim 3, wherein each stator feed unit has control logic, with the control logic of the stator feed units being connected to the ring communication link, and the control logic of each switching device is connected to the control logic of an associated stator feed unit via the communication link.

5. The starting apparatus as claimed in claim 2, wherein the exciter units which are each connected via the communication link to a switching device each have control logic, with the control logic of the exciter units being connected to the ring communication link, and being connected to the superordinate control unit via the communication link; and wherein each switching device has control logic, with the control logic of each switching device being connected to the control logic of a respective exciter unit via the communication link.

* * * * *